March 17, 1931.    H. A. BRITTAIN    1,797,187
PNEUMATIC TIRE TREAD
Filed Oct. 19, 1925
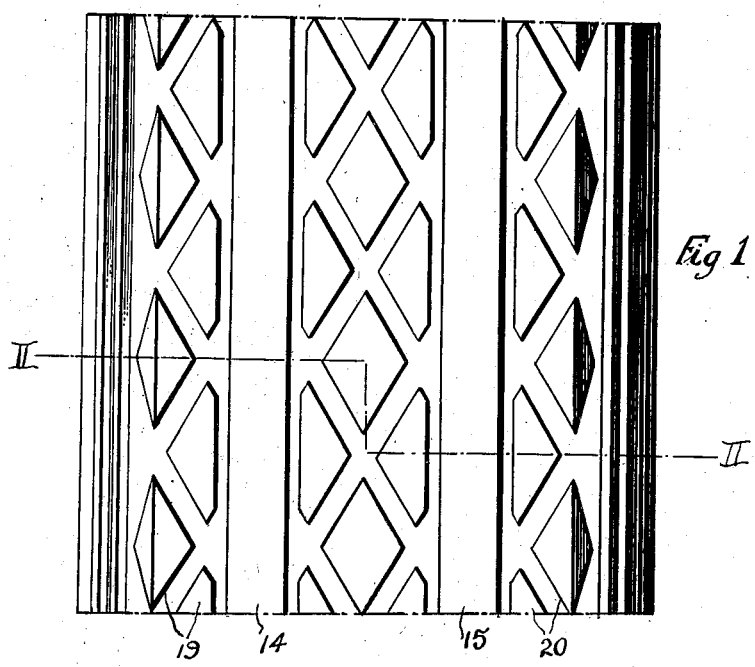
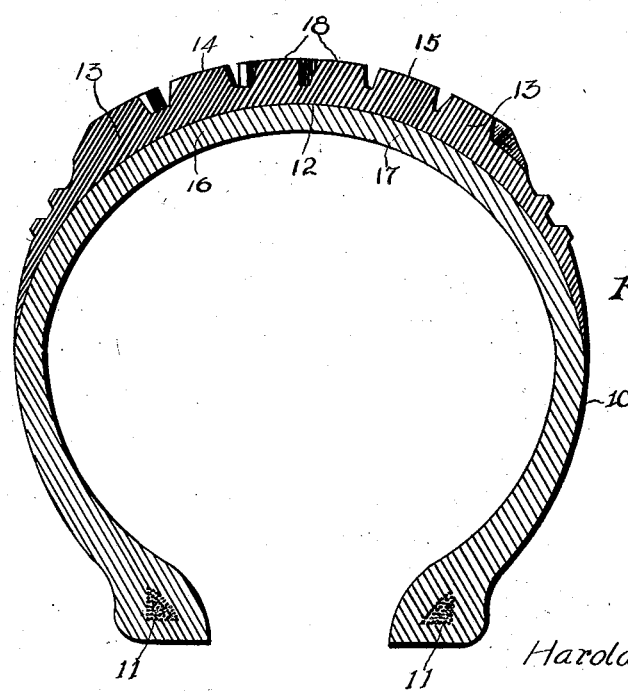
Inventor
Harold A Brittain.
By
Attorney Patented Mar. 17, 1931

1,797,187

UNITED STATES PATENT OFFICE

HAROLD A. BRITTAIN, AKRON, OHIO, ASSIGNOR TO THE GOODYEAR TIRE & RUBBER COMPANY, OF AKRON, OHIO, A CORPORATION OF OHIO

PNEUMATIC-TIRE TREAD

Application filed October 19, 1925. Serial No. 63,399.

My invention relates to pneumatic tire casings and it has particular relation to the structure of the tread portion of such tire casings.

One object of my invention is to provide a tire which is so designed that the greatest pressure forces per unit area exerted therein incident to road service will be imposed at predetermined areas about the contour thereof, and in which special means are employed for resisting wear at such areas.

Another object of my invention is to provide a tire having a non-skid tread, whose traction or non-skid elements are so constructed that they will cause the tread portion of the tire to wear uniformly, and which tread elements are so arranged that they will prolong the life of the tire tread.

In the manufacture of pneumatic tires, as heretofore practised, numerous structures have been employed with a view to producing a tire which will prevent skidding of the vehicle upon which it is employed. Under conditions of road service, these non-skid elements were usually worn away before the remander of the tire was worn out, and thus the worn tire functioned during a large portion of its useful life without the advantages of the non-skid elements. The majority of these tire structures have been employed in conjunction with high pressure tires, but with the advent of the low pressure or so-called balloon tires, new conditions arose owing to the relative flexibility of the balloon tire tread and carcass, and owing to the desirability of providing a wide road contact area, which conditions were not contemplated in the structure of the commonly known high pressure tires. Accordingly new problems presented themselves, which have been the subject of much research and experimentation in constructing tires of the balloon type.

One of the characteristic disadvantages of employing the old type of tread on the balloon tire resides in the fact that the tread is worn unevenly, and consequently bumps are formed on the tire tread, which cause undesirable riding qualities, and also tend to increase the rate of wear on the tread and on the carcass. Moreover, because of the relatively great road contact area of the balloon tire, considerable noise results from the use of treads similar to those employed on high pressure tires.

My invention obviates the undesirable characteristics above enumerated by providing a tire structure especially adapted to be incorporated in balloon tires, although not restricted to this type of tire. Generally, my improved tire tread consists of spaced ribs encircling the tread of the tire combined with independently functioning traction or non-skid elements arranged in rows between the ribs, and additional rows of such elements arranged beyond the ribs toward the sides of the tire. These ribs and traction elements are formed on a tread which is semi-flat in cross-section in order that they may substantially conform to the road surface when the tire is subjected to load. Tests have been conducted revealing the fact that, in tire treads constructed in this manner, the greatest unit load forces are imposed at the shoulders of the tire, that is, along the area substantially midway between the circumferential center of the tread and the outer edges thereof. The circumferential ribs are disposed along this area and therefore sustain a greater portion of the load.

For a better understanding of my invention reference may now be had to the accompanying drawings forming a part of this specification, of which;

Fig. 1 is a fragmentary plan view of a tire casing embodying my invention; and

Fig. 2 is a cross-sectional view of a tire casing embodying my invention, the view being taken substantially along the line II—II of Fig. 1.

In practicing my invention, I have incorporated one form which it may assume in a tire casing 10 provided with beads 11 and a tread portion 12. It will be observed by reference to Fig. 2 that the portions of the tread adjacent the sides of the tire, as indicated at 13, are made relatively thick, in order that the outer contour thereof may be semi-flat at its road engaging portion and will therefore more readily conform to the road surface when a load is imposed upon the tire.

The tread of the tire is provided with two circumferential ribs 14 and 15, which are disposed at the circumferential shoulders 16 and 17 of the tire. At the central portion of the tire between the ridges 14 and 15, a plurality of non-skid or traction elements 18, arranged in staggered relation, are formed, whose outer surfaces are of the same height in relief as the surfaces of the circumferential ribs. Additional rows of non-skid traction elements 19 and 20, similar to the elements 18, are arranged at the outer portions of the tread adjacent the sides of the tire. The non-skid elements 18, 19 and 20 are of diamond contour, such shape being chosen because of the high efficiency thereof as a non-skid element.

Because of the fact that the tread elements are independently formed, and separated by grooves, the action of each is independent, and when load is imposed upon the tire they are permitted to spread while in contact with the road surface. As the ribs 14 and 15 are continuous, they will offer relatively greater resistance to compression against the road surface than the non-skid elements, and as they are disposed at the shoulders of the tire where the maximum load is imposed, a greater portion of the load will be supported thereby. Under these conditions of distribution of unit load pressure the non-skid elements 18 will be protected by the wear resisting ribs, and their life will be materially prolonged. Furthermore, direct contact of the non-skid elements with the road will assure efficient traction, which will prevent skidding.

A portion of the load will also be carried by the outer traction elements 19 and 20, but the wear upon these elements will be less than that upon the central elements of the tread. After the central elements are worn to such an extent that they will no longer function efficiently as non-skid elements, the outer elements 19 and 20 will still serve to prevent skidding by providing effective traction surfaces.

Because of the even distribution of a greater portion of the load upon the circumferential ribs, and because of the individual action of each non-skid element in sustaining its lesser portion of the load forces, the possibility of uneven wearing surfaces being formed on the tread is reduced to a minimum. On the other hand, if the elements were connected by integral blocks or formed integrally with each other, the connecting members would cause distortion forces to be transmitted from one to another, and such interference with independent action would result in an undesirable uneven or bumpy traction surface. As the circumferential ribs are spaced from the traction elements, thereby dividing them into a plurality of rows, excessive noise incident to the engagement of the tread with the road surface will be greatly reduced.

It should be noted that although a greater amount of rubber is disposed adjacent the shoulders of the tire, as, for example, by means of the ribs 14 and 15, yet the distribution of rubber circumferentially is uniform. Therefore, if an infinite number of transverse cross-sectional areas are taken through the tire, the average of those areas will establish that the greatest area is located adjacent the shoulders of the tire. Likewise, since the ribs and segmental tractive elements are of equal depth, the average road-engaging area of the tread is greatest in the zones of the shoulders of the tire, that is, the ribs present a greater surface area than the combined surface area of the segmental tractive elements, but, at the same time, the breadth of road-engaging surface is uniform considering the entire circumference of the tire.

From the foregoing description, it will be apparent that my invention provides a practical solution for the problems of constructing a tire tread which possesses the combined qualities of long life, protection to non-skid tread elements, and elimination of excessive noise in use.

Although I have illustrated but one form which my invention may assume and have described in detail but a single application thereof, it will be apparent to those skilled in the art that it is not so limited but that various minor modifications and changes may be made therein without departing from the spirit of my invention or from the scope of the appended claims.

What I claim is:

1. A pneumatic balloon tire casing adapted to sustain the maximum load pressure at the shoulder portions thereof, comprising circumferential ribs located at the sholuder portions to sustain said maximum load pressure, traction inducing protuberances disposed intermediate and on the outer sides of the ribs, said protuberances being spaced from the ribs and from each other and of substantially equal height with said ribs, all said traction protuberances and ribs functioning independently of each other and being so arranged that the load pressure per unit area is substantially uniform along the road engaging portion of the tread.

2. A pneumatic balloon tire provided with a relatively flat road-engaging tread portion, comprising a circumferential rib disposed adjacent each shoulder portion of the tread, and diamond-shape non-skid elements of the same height in relief as the ribs disposed between the ribs and beyond the ribs toward the sides of the tire, the ribs being separated from adjacent elements by grooves corresponding in depth to the height in relief of the ribs.

3. A non-skid tread for a balloon tire comprising two circumferential ribs, a plurality of rows of staggered non-skid elements disposed between the ribs and a plurality of rows of non-skid elements disposed between each rib and the adjacent side of the tire, all the elements being separated from the ribs and from each other by grooves of uniform depth.

4. A pneumatic balloon tire casing comprising a tread member provided with a circumferentially extending rib member disposed adjacent each shoulder of the casing, a plurality of traction elements of substantially equal height with the rib members disposed between and outside of the rib members and being spaced from said rib members and from each other, said traction elements being so arranged as to maintain the lateral cross-sectional area of said tread member substantially uniform throughout the tire casing.

In witness whereof, I have hereunto signed my name.

HAROLD A. BRITTAIN.